May 26, 1942.     S. HANSEN     2,284,389
RECTIFYING SYSTEM
Filed Aug. 31, 1940
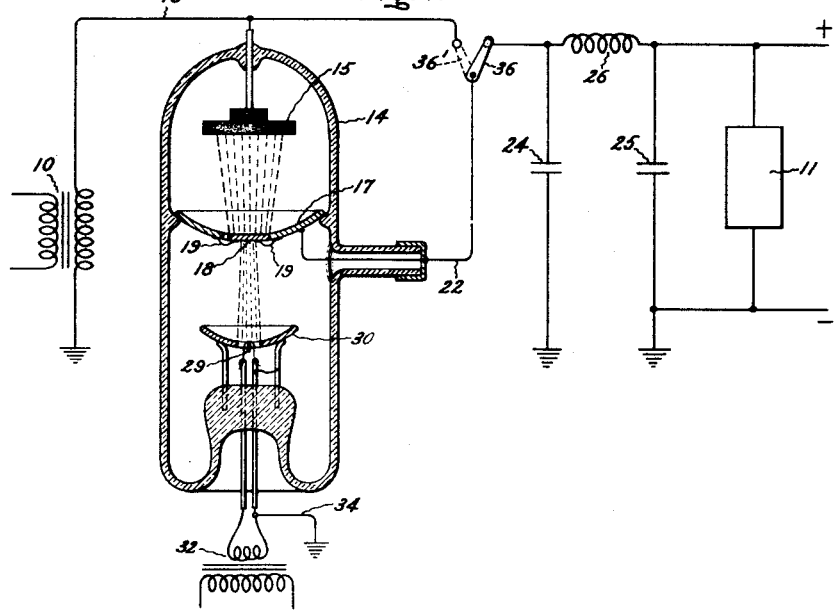
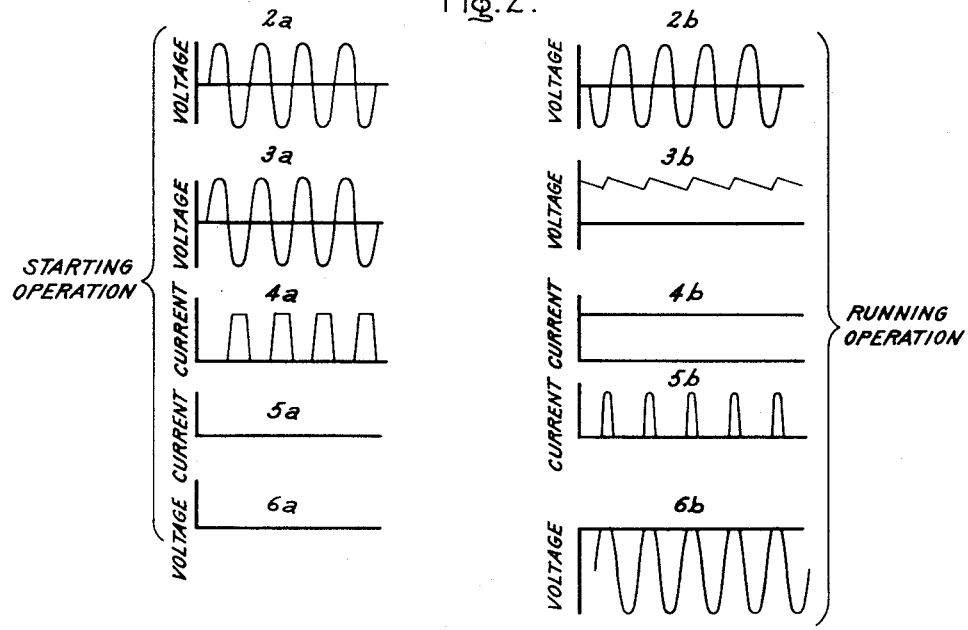
Inventor:
Siegfried Hansen,
by Harry E. Dunham
His Attorney.

Patented May 26, 1942

2,284,389

UNITED STATES PATENT OFFICE 2,284,389

RECTIFYING SYSTEM

Siegfried Hansen, Schenectady, N. Y., assignor to General Electric Company, a corporation of New York Application August 31, 1940, Serial No. 355,060

2 Claims. (Cl. 175—363)

The present invention relates to an improved high voltage rectifying system and is considered especially applicable in connection with a device such as an X-ray tube requiring separate rectifying means, or in the power supply circuit of a television apparatus or the like.

Direct current power supplies using vacuum tube rectifiers are usually operated with the negative terminal grounded. The cathode of the rectifier tube thus becomes the high voltage terminal, and it and its connected heating circuit must be adequately insulated from the grounded or low potential parts of the system. In the case of power supplies operating above 5,000 volts, this usually means that the cathode must be supplied with heating current through an insulating transformer, the cost of which may be a considerable part of the total cost of the apparatus.

It is an object of the present invention to provide an electronic rectifying system in which the cathode of the rectifier tube is inherently insulated from ground without special insulation of its heating means. This is accomplished in accordance with the preferred embodiment of the invention by the provision of an auxiliary cathode which is separate from the main cathode and which serves to heat the main cathode by producing a heat-generating discharge thereto. The auxiliary cathode, which may be grounded, is provided with a separate source of heating current, also grounded if desired, and is so connected that at least a portion of the rectified output voltage of the rectifier tube is impressed between it and the main cathode. As a result of this connection the tube is in a sense self-energizing as to its heating circuit.

The features which I desire to protect herein are pointed out with particularity in the appended claims. The invention itself, together with further objects and advantages thereof may best be understood by reference to the following description taken in connection with the drawing in which Fig. 1 illustrates diagrammatically a suitable embodiment of the invention and Figs. 2 to 6 are graphical representations useful in explaining the invention.

Referring particularly to Fig. 1, there are represented at the opposite extremities of the figure a source of alternating current, illustrated as a transformer 10, and a load device 11 which is to be supplied with rectified current from the source 10. It is assumed that the load device 11 is of a character which requires the application of a voltage sufficiently high to necessitate substantial insulation of the high potential parts of the system. (It may be, for example, an X-ray tube or a television apparatus or the like.) The negative terminal of the load device 11 is shown grounded, this being the arrangement which is conventional in apparatus of the character specified.

For the purpose of rectifying the potential derived from the source 10 there is provided in circuit between the source and the load device 11 an electronic rectifier 14. This includes an anode 15 which connects with a terminal of the source 10 through a circuit conductor 16 and a cathode positioned in cooperative relation to the anode. As illustrated, the latter electrode consists of an annular part 17, which is suitably of metal and which is appropriately supported from the wall of the rectifier envelope, and a central disk portion 18 which is mounted from the annular part by wirelike supports 19. The narrow cross section of these latter supports tends to minimize loss of heat by conduction from the central or active part of the cathode. The disk 18 may consist of tungsten or similar metal and may be coated with thoria or with some other material adapted to enhance its emissivity.

In the normal operation of the apparatus, the cathode structure, which is provided with a lead-in conductor 22, is connected to the positive terminal of the system, the indicated connection causing the potential applied to the load device 11 to be of rectified character. The pulsating quality of the voltage thus supplied is minimized by the use of a smoothing network including condensers 24 and 25 and a series reactor 26.

Due to the fact that the cathode is in effect directly connected with the positive or high voltage terminal of the system it and all its associated parts must be fully insulated from ground. This requirement presents considerable difficulty with respect to the heating means employed for maintaining the cathode at an electron-emitting temperature. For example, the use of a resistance heater for this purpose, as is conventional in devices of the type under consideration, presupposes the existence of a source of heating current connected to the cathode. Since such current is most conveniently supplied from a grounded supply line, it has been customary in this connection to interpose between the supply line and the resistance heater for the cathode an insulating transformer of such character as to sustain the full operating potential of the system. Such a transformer may be relatively expensive, and in some cases its cost comprises a substantial part of the entire cost of the apparatus.

In accordance with my present invention this item of expense is avoided by the use of a separate auxiliary cathode which serves to heat the main cathode while being fully insulated therefrom so that the auxiliary cathode and its associated parts may be maintained at ground potential if desired. The auxiliary cathode referred to is shown in Fig. 1 as comprising the combination of a spirally arranged filamentary heater 29 and a focusing cup 30 which is directly connected to the filament 29 and which serves to concentrate the electron emission therefrom. The filament 29 may be coated with an emission-enhancing material, such as thoria or alkaline earth material, and is heated by connection to an appropriate current source. Such a source is shown as comprising a voltage step-down transformer 32, but it will be understood that the use of a transformer in this instance is solely for the purpose of providing a voltage of appropriate magnitude for heating purposes and that the transformer need not comprise any substantial insulating provisions. Indeed it will be noted that the auxiliary cathode and the secondary of the heating transformer are grounded by a grounding connection 34. One terminal of the primary of the transformer 32 may also be grounded if desired.

It will be apparent that during the normal operation of the apparatus, substantially the full rectified potential appearing between the high and low voltage terminals of the system is applied between the auxiliary cathode and the main cathode. Consequently a discharge between these elements may be expected to occur, with electrons proceeding from the emitting surfaces of the filament 29 to the lower surface of the disk 18. The resultant heating of the disk will maintain it at a temperature at which its emissive parts may give off electrons, and the occurrence of a discharge between these parts and the anode 15 will thus be permitted.

The mode of operation described in the foregoing obviously presupposes that the system is operating in its normal manner so that a rectified potential is impressed between the main and auxiliary cathodes. During the initial starting period of the system this condition will not exist, and special means is therefore provided for rendering the system initially operative. Such means comprises a switch 36 by means of which the main cathode may be transferred from its normal connection to a direct connection with the anode 15 of the rectifier. The position of the switch corresponding to this latter connection is indicated by the dotted line 36'. With this connection the alternating potential developed by the source 10 is impressed between the auxiliary cathode and the main cathode so that the latter is enabled to act as the anode for a rectifying discharge. After this discharge has proceeded long enough for the cathode disk 18 to have reached an emitting temperature, the switch 36 may be thrown to its right hand position and the system will then proceed to operate in its intended manner.

The operation of the system described in the foregoing may be better understood by a consideration of Figs. 2 to 6, which respectively represent the voltage relationships between various operating parts of the system, these relationships being shown both for the starting and running conditions of the system.

Figs. 2a and 2b represent simply the supply voltage as derived from the transformer 10 and thus show simply sinusoidally alternating curves. Fig. 3a shows that the voltage existing between the main and auxiliary cathodes during the starting period is substantially identical with the supply voltage, and Fig. 4a shows the pulsating form of the rectified current which results between the two cathodes during starting operation. Because of the discontinuous character of the heating discharge during this period, it may be desirable in some cases to provide means for temporarily overheating the filament 29 so as to increase its emission and thus to enhance the heating effect prior to initiation of normal operation.

The normal running characterisitcs of the auxiliary heating circuit are shown by Figs. 3b and 4b, the first of these figures being also at least approximately representative of the voltage occurring between the high voltage and low voltage terminals of the load device 11. It will be understood that the sawtooth character of Fig. 3b represents the slight charging and discharging of the condensers 24 and 25 which occurs during the various parts of the potential cycle. As a result of the stabilizing effect of these condensers the current between the main and auxiliary cathodes is substantially constant during normal operation as indicated in Fig. 4b.

Figs. 5a and 5b and 6a and 6b respectively represent the variations of current and voltage between the main cathode and the anode 15 for the starting and running conditions of the system. Obviously during the starting period both the current and voltage between these electrodes are zero as a result of the fact that the electrodes are directly electrically connected. During normal running operation, pulses of current pass between the electrodes during the conductive periods of the rectifier (Fig. 5b). During such periods, the only voltage between the anode and the main cathode (Fig. 6b) is that corresponding to the internal drop in the rectifier, which may be relatively slight. At other periods the inverse voltage of the system appears across the rectifier terminals.

While the invention has been described with reference to a particular embodiment thereof, it will be understood that numerous modifications may be made by those skilled in the art without departing from the invention. I, therefore, aim in the appended claims to cover all such equivalent variations as come within the true spirit and scope of the foregoing disclosure.

What I claim as new and desire to secure by Letters Patent of the United States is:

1. In an electrical system involving the use of a unidirectional potential of sufficient intensity to require substantial insulation of the high potential parts of the system, the combination which includes a high potential terminal and a low potential terminal for the system, an alternating current source, and an electronic rectifier in circuit between the said source and the said terminals for supplying rectified potential from the former to the latter, said rectifier comprising an anode connecting with the said source, a main cathode cooperating with said anode and connecting with the said high potential terminal of the system, a separately heated auxiliary cathode cooperating with said main cathode, a source of heating current connecting with the auxiliary cathode, and means effective during the normal operation of the system to impress between the main and auxiliary cathodes at least a substantial portion of the rectified potential existing between the said system terminals, thereby to produce between such cathodes a continuous unidirectional discharge adapted to maintain the main cathode at an emissive temperature; the main cathode being insulatingly separated from the auxiliary cathode within the rectifier whereby the need for additionally insulating the main cathode from the low potential parts of the system is avoided.

2. In an electrical system of which certain parts only are to be grounded, the combination which includes a high potential source of alternating current, a grounded terminal and an ungrounded terminal for the system, and an electronic rectifier in circuit between the said source and the said terminals for supplying rectified potential from the former to the latter, said rectifier comprising an anode connecting with said source, a main cathode cooperating with said anode and connected to the said ungrounded terminal of the system during normal operation of the system, a separately heated auxiliary cathode positioned in spaced cooperative relation to said cathode and having a source of heating current connected thereto, means for grounding said auxiliary cathode and said heating source so as to cause substantially the full rectified potential of said system to be applied between the main and auxiliary cathodes during normal operation of the system, and switching means useful during initial starting of the system for establishing a temporary connection between said main cathode and said anode, thereby to produce between the main and auxiliary cathodes an intermittent heat-generating discharge of such character as to bring the main cathode to electron-emissive temperature.

SIEGFRIED HANSEN.